United States Patent [19]

Wales et al.

[11] Patent Number: 4,741,922

[45] Date of Patent: May 3, 1988

[54] METHOD OF MANUFACTURING A MAGNETIC STORAGE MEDIA

[75] Inventors: James L. S. Wales, Caversham; Robert A. Woolley, Uxbridge, both of England

[73] Assignee: EMI Limited, Hayes, England

[21] Appl. No.: 877,415

[22] Filed: Jun. 23, 1986

[30] Foreign Application Priority Data

Jul. 1, 1985 [GB] United Kingdom ............... 8516605

[51] Int. Cl.⁴ ............................................. H01F 10/02
[52] U.S. Cl. .................................... 427/130; 427/132; 427/173; 427/289; 427/296
[58] Field of Search ............... 427/130, 132, 173, 289, 427/296

[56] References Cited

U.S. PATENT DOCUMENTS 2,898,662 8/1959 Robertson ............................. 29/113

FOREIGN PATENT DOCUMENTS 1104708 2/1968 United Kingdom .
1420214 1/1976 United Kingdom .
1458353 12/1976 United Kingdom .

OTHER PUBLICATIONS

The origin of Stress in Metal Layers Condensed from the Vapour in High Vacuum, H. P. Murbach et al., Proc. Phys. Soc. B, vol. 66, pp. 905-910, 1953.
"Magnetic Recording for Computers," by M. F. Dudson et al., Proc. IEE, IEE Reviews, vol. 119, No. 8R, Aug. 1972, pp. 956-984.

Primary Examiner—Bernard D. Pianalto
Attorney, Agent, or Firm—Fleit, Jacobson, Cohn & Price

[57] ABSTRACT

Transverse bowing of a plastics web coated with a magnetic thin metal film is substantially eliminated by laterally stretching the coated web such that the lateral stress applied to the metal film exceeds the tensile strength of the film and the lateral stress applied to the plastics web lies within the yield point of the plastics material. The coated web is stretched by passage over a curved roll adjusted to provide a lateral strain of at least 1% and typically 1.8% in the web, and such stretching may cause a pattern of interlaced micro-cracks to occur in the metal film. Recording tapes slit from such stretched webs exhibit negligible cupping, and the pressure of micro-cracks has no adverse effect on recording performance or wear.

8 Claims, 4 Drawing Sheets

METHOD OF MANUFACTURING A MAGNETIC STORAGE MEDIA

The present invention relates to magnetic storage media and is especially, although not exclusively, applicable to magnetic tape.

It has been proposed to provide a magnetic tape in which a flexible plastics substrate is coated with a continuous thin film of a ferromagnetic metal which is typically a cobalt based alloy such as cobalt-nickel or cobalt-chromium. The metal film may be vacuum evaporated on to a comparatively wide web of the substrate material and subsequently slit into lengths of recording tape of the appropriate width. Alternative coating processes including sputtering, ion beam deposition and chemical plating have been proposed.

It has long been known that thin metal films are generally mechanically stressed as they are deposited. The paper "The origin of stress in metal layers condensed from the vapour in high vacuum" by H. P. Murbach and H. Wilman published in "Proceedings of the Physical Society, B" volume 66 page 905, 1953, for example, disclosed generally tensile stresses in evaporated metal films which may exceed the elastic limit of the bulk material. This publication also made reference to high levels of stress in chemically deposited films.

Evaporated cobalt based films generally exhibit tensile stress, and when such films are deposited onto a thin flexible plastic web, as in recording tape manufacture, the web develops a transverse bow with a concave coated surface. Recording tape slit from such a web is similarly bowed across its width and such bowing is commonly described in the recording industry as "cupping".

A cupped recording tape is generally difficult to handle in a magnetic tape drive and, furthermore, intimate contact between the tape and the recording heads may be difficult to achieve, resulting in poor resolution of short wavelength signals. These problems are particularly apparent in recently developed video recording systems for which the base film is very thin, in the thickness range 10 to 12 micro-meters, and in which the shortest recorded wavelength may be below 1 micrometer. While it is well known that metal film magnetic media are potentially capable of meeting, and exceeding, these stringent requirements, it is essential that the above mentioned mechanical difficulties associated with cupping should first be overcome.

Various methods of reducing the cupping effect in evaporated metal film recording tape have been proposed. For example, it is known from the above mentioned publication by H. P. Murbach and H. Wilman that an evaporated film of aluminium may exhibit compressive rather than tensile stress. Metal film recording tape having an evaporated aluminum underlay between the base film and the magnetic overlay as is disclosed, for example, in British Pat. specification No. 1458353, has been found to exhibit markedly reduced cupping as a result of the overall reduction in tensile stress. Cupping may also be reduced by heat treating the coated base film. British Pat. specification No. 1420214, for example discloses the evaporation of a cobalt based alloy from an offset source on to a polyester web as it is spooled over a drum. The coated web is then spooled over a heated roller which softens the plastics substrate and which reduces the tendency to cupping. While such known methods have been reasonably successful in reducing cupping to an acceptable level for past recording standards, the use of such methods, both individually and in combination, has proved inadequate for the thinner substrates and shorter recorded wavelengths now required for video and other high density recording media.

It is an object of the present invention to provide an improved method of manufacturing a storage medium, said medium including a flexible plastics substrate and a deposited thin film of a magnetic metal or alloy, wherein any curvature of the medium caused by stress in the film is substantially reduced. According to one aspect of the invention, a method of manufacturing a storage medium includes the steps of coating a web of flexible plastics material with a thin film of a metal or alloy and laterally stretching the coated web such that the lateral stress applied to the metal film exceeds the tensile strength of the film and the lateral stress applied to the plastics web lies within the yield point of the plastics material whereby curvature of the medium caused by stress in the film is reduced.

An embodiment of the invention will now be described, by way of example, with reference to the accompanying drawings in which:

DETAILED DESCRIPTION OF THE DRAWINGS

Figure 1:
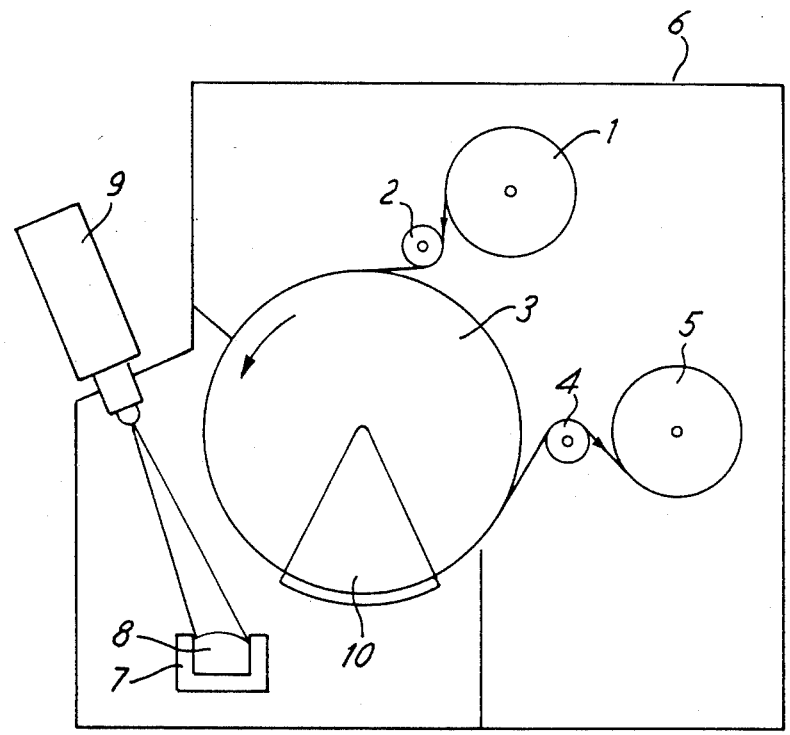
FIG. 1 is a side view of the basic components of an evaporation plant for the coating of a web of plastics material with a thin metallic film.

The basic components of a vacuum evaporation plant for coating a web of polyester base foil are shown in FIG. 1. The web is fed from a supply reel 1 under a roller 2, round a rotating drum 3 and over a second roller 4 on to a take-up spool 5, the assembly being mounted within a vacuum chamber 6. The evaporation source is a trough 7 of a molten cobalt alloy 8 which is heated by means of an electron beam gun 9. The vacuum chamber is connected to a vacuum pump (not shown) and the pressure in the chamber is typically adjusted to lie within the range of $10^{-8}$ to $10^{-7}$ bar. A shutter 10 is positioned such that the cobalt alloy is evaporated on to the web at a high angle of incidence to provide a thin magnetic film of high coercivity in the longitudinal direction as is disclosed for example in British Pat. specification No. 1104708. The coated web is wound on to the take-up spool 5 and, following a coating run, the take-up reel may be removed from the vacuum chamber and the coated web longitudinally slit into a multiplicity of lengths of magnetic tape. The web width is typically in the order of 70 cm in a production coater, and, in a coating run, a web length of some 10,000 m may be coated at a speed of 100 m/minute.

Figure 2:
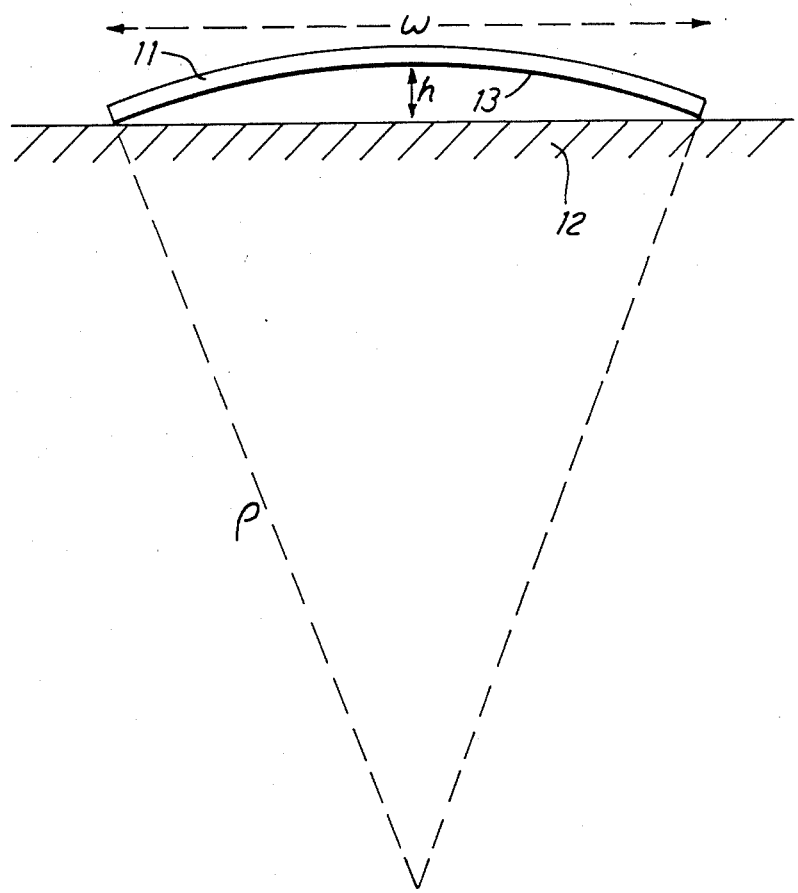
FIG. 2 is a sectional view of a cupped metal film recording tape resting on a surface plate with its coated surface downwardly facing.

The examples to be described utilised a small laboratory coater having the features of FIG. 1 and which handled web widths of up to 19 cm. A polyethelene terephthalate polyester web of thickness 12 micrometers and width 10 cm was coated from an ingot of 80:20 cobalt nickel alloy at near-grazing incidence. The thickness of the coating was in the order of 100 nm. After the coating run, the vacuum chamber was opened and the coated web on the take-up reel 5 was removed. Cupping was so severe that an unconstrained strip of the coated foil, cut parallel to the width of the web, formed a complete substantially circular turn, with the coating inwardly facing to have a cupping radius of approximately 16 mm. The coated web was then slit into lengths of tape of width w=12.6 mm. The extent of cupping, or cupping height, in the slit tape could be measured by placing a short length of tape 11 facing downwardly on a horizontal surface plate 12, shown in FIG. 2. The maximum height of the downwardly facing magnetic thin film 13 above the surface plate provides a measure of the extent of cupping and, provided the cupping height h is small compared with the radius of cupping $\rho$, h and $\rho$ are approximately related by the equation:

$$h = \frac{w^2}{8\rho} \quad (1)$$

In the above example, the calculated value of h is 1.24 mm for w=12.6 mm and $\rho$=16 mm. This figure was in good agreement with a number of direct measurements of cupping height on samples prepared from the above-described coated web.

Lengths of tape prepared as above were packed into cartridges for use on two commercially available video recorders, a Philips V-2000 (Registered Trade Mark) machine and a Ferguson VHS (Registered Trade Mark) machine. While it was possible to record and replay video signals on these lengths of tape, the cupping of the tape resulted in poor mechanical handling and in inferior picture quality due to poor resolution of short wavelength signals on both machines.

The present invention provides a method of substantially correcting the cupping in a metal film recording tape by laterally stretching the coated web such that the tensile strength of the metal film is exceeded and the yield point of the plastics web material is not exceeded. The method provides a recording tape having good handling and wear properties and surprisingly good short wavelength resolution.

A preferred method of laterally stretching the coated web involves the use of a curved roll comprising a non-rotating adjustable curved axle on to which are threaded a series of ball bearing assemblies supporting an outer flexible rubber sleeve as is described, for example in U.S. Pat. No. 2898662. Such rolls have hitherto been used to laterally stretch webs of various materials including textiles, paper, metal foils and plastics, and it has been known to provide curved rolls with vacuum coaters, both before and after coating, in order to remove creases and wrinkles from the substrate material. When used for such purposes after the evaporation of metal films on to plastics webs, the curvature of the roll and the wrap angle of the web have hitherto been carefully chosen such that the lateral stress applied to the metal film should not exceed the elastic limit of the metal film coating in order to avoid any cracking or crazing of the metal film.

Past teaching, for example in British Pat. specification No. 1458353, has led to the commonly held belief that any cracking or crazing of the coating would cause unacceptably high modulation noise with short wavelength recordings. The lateral strain in the web in such prior use of curved rolls has typically lain in the region of 0.3% to 0.4% and, while such strains are effective in removing any creases or wrinkles from the web material, they have a negligible effect on the extent of cupping in a coated web.

Figure 3:
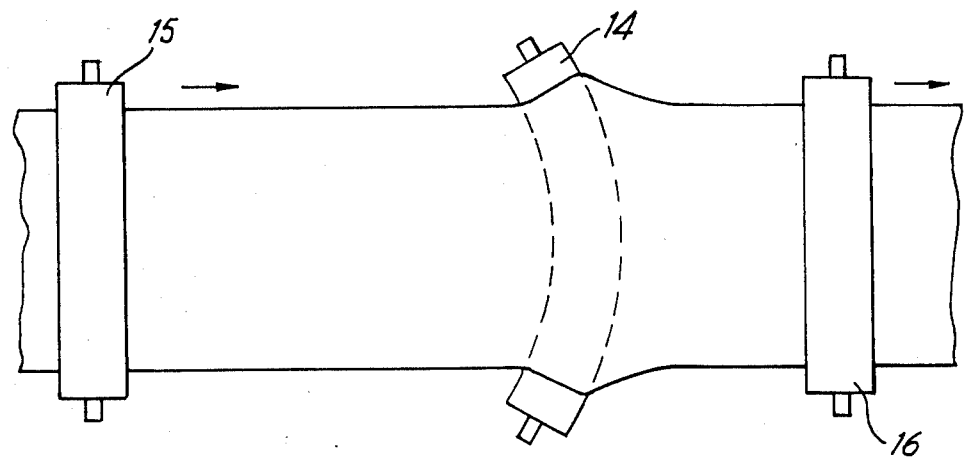
FIG. 3 is a diagrammatic representation of a curved roll assembly, viewed from above, and shown with exaggerated roll curvature.
Figure 4:
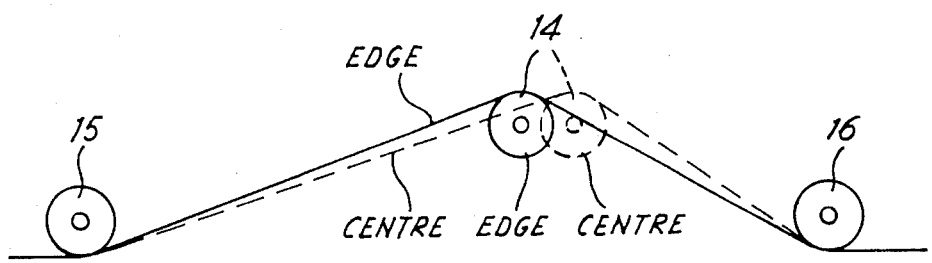
FIG. 4 is a side view of the representation of FIG. 3.
Figure 5:
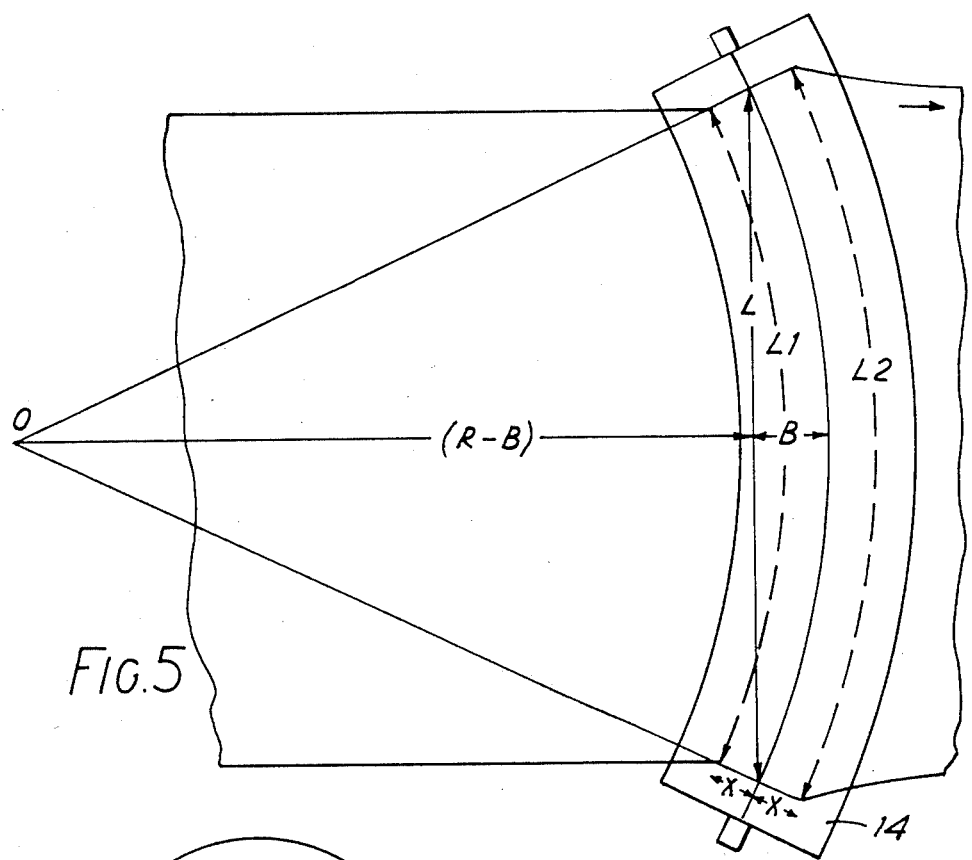
FIG. 5 shows the lateral stretching action of a curved roll, viewed from above.
Figure 6:
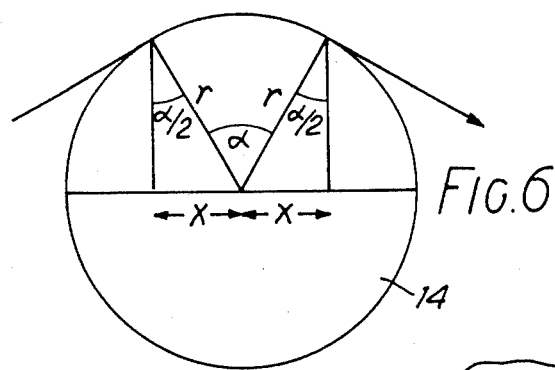
FIG. 6 is an end view of the curved roll of FIG. 6.

In one embodiment of the present invention and with reference to FIGS. 3 and 4, the reel 5 on to which the aforementioned cupped coated web was spooled was removed from the chamber and the web was driven, with the coated surface facing upwards under a first plain roller 15, over a curved roll 14 and under a second plain roller 16, to be spooled on a further reel (not shown). The curvature of the roll and the wrap angle of the web were adjustable. The roll handled web widths up to 19 cm, and the roll sectional diameter 2r was 38 mm. Referring to FIGS. 5 and 6, the wrap angle $\alpha$ was adjusted to 90°. The extent of lateral strain was controlled by varying the radius of curvature R of the roll, and the actual strain was calculated as follows:

$$\frac{\text{Web width on leaving roll } L_2}{\text{Web width on approaching roll } L_1} =$$

$$\frac{R + X}{R - X}, \text{ where } X = r \sin \frac{\alpha}{2}$$

In general, R>>X and $$\frac{L_2}{L_1} \approx 1 + \frac{2X}{R}$$

and Lateral Web Strain $$S = \frac{L_2}{L_1} - 1 = \frac{2X}{R},$$

i.e.

$$S = \frac{2r}{R} \sin \frac{\alpha}{2} \quad (2)$$

Equation (2) shows the lateral strain in a web to be dependent only on the wrap angle, the sectional radius and the curvature of the curved roll, and independent of the web width. This conclusion is significant in comparing results from a small scale coating equipment handling web widths of typically 10 cm with results from a production sized equipment handling web widths of typically 70 cm.

Referring to FIG. 5, if the curved roll is of width L and has a bow B, $$B(2R - B) \approx \left(\frac{L}{2}\right)^2$$

and, if R>>B, $$R \quad \frac{L^2}{8B}$$

Equation (2) may then be conveniently expressed as:

$$S \quad \frac{16Br}{L^2} \sin \frac{\alpha}{2} \quad (3)$$

In the experiments to be desribed, L was maintained at 190 mm, r was maintained at 19 mm and α was maintained at 90°. With these figures, the strain in the web was defined, from Equation (3), by S=0.0060B for a bow of Bmm.

The bow was first adjusted to a figure of B=0.6 mm, corresponding to a lateral strain of 0.0036 or 0.36% and a length of the 10 cm wide coated web was driven over the curved roll assembly. This level of strain corresponded closely with the level of strain used in curved rolls for production coaters for crease removal and typically operate with L=700 mm, B=7 mm, r=60 mm and α=30° to provide a lateral strain of 0.35%. Observation of the coated web at this level of lateral strain showed no reduction to cupping, and no change to the surface texture of the coating.

The bow was then increased to a figure of B=1.67 mm, corresponding to a lateral strain of 0.010 or 1.0% and a second length of the coated web was driven over the curved roll assembly. Observation of the coated web showed a marked reduction in cupping. Furthermore, microscopic examination of the coating at ×100 magnification revealed a faint pattern of interlaced micro-cracks lying in the generally longitudinal direction.

Figure 7:
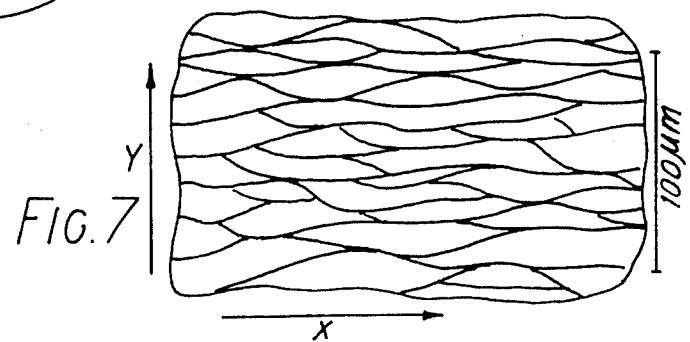
FIG. 7 is a magnified view of the surface of a metal film recording medium after decupping, showing a fine network of micro-cracks.

The bow was then increased to a figure of B=3.0 mm, corresponding to a lateral strain of 0.018 or 1.8% and a third length of coated web was driven over the curved roll assembly. Observation of the coated web indicated that the cupping of the web had effectively vanished and microscopic examination of the surface of the coating again revealed a pattern of interlaced micro-cracks in the generally longitudinal direction as illustrated in FIG. 7. The pattern of micro-cracks indicated that, in driving the coated web over the curved roll, the laterally applied stress had exceeded the tensile strength of the film material. The polyester base foil, however, retained negligible lateral stretching and the applied stress had lain well within its yield point.

The third length of coated web was slit into 12.6 mm wide lengths of tape which were assembled into cartridges for use in V-2000 and VHS video recorders. Mechanical handling of the tape presented no difficulties, and the short wavelength response and observed picture quality were excellent, with negligible modulation noise. Wear tests indicated that such tapes could withstand at least 500 passes without picture degradation. These excellent results were indeed surprising and quite contrary to past teaching from, e.g. British Pat. specification No. 1458353, which had indicated that any cracking or crazing of the surface should be avoided. While it is appreciated that curved rolls have hitherto been used in association with vacuum coating apparatus, such usage has been restricted to the elimination of creases and wrinkles in the base film and the conditions of lateral strain as defined in the present invention have been deliberately avoided.

It will be appreciated that the invention has been described by way of example only, and other embodiments of the invention will be apparent to those skilled in the art. For example, the coated web may first be provided with an underlay of, e.g., aluminium, and the coated web may receive a heat treatment before being driven over the curved roll. A curved roll may be incorporated, at the position of roller 4, in the vacuum chamber or, alternatively, may be used after the reel 5 has been removed from the chamber. Furthermore the invention is not limited to use with evaporation coating apparatus, and may be used to correct cupping which has been introduced in any deposition process.

The extent of bow required to provide a given lateral strain S in a curved roll assembly having different dimensions may be readily derived from equation (3), i.e.

$$B = \frac{L^2 S}{16r} \sin \frac{\alpha}{2} \quad (4)$$

For example if a lateral strain S of 0.018 were required with the aforementioned production curved roll for which L=700 mm and r=60 mm, a wrap angle α of 90° and a bow B of 13.0 mm would meet the requirement.

It will be further appreciated that, once the required extent of lateral strain has been established for a production equipment, a curved roll of fixed rather than adjustable curvature may be utilised.

What is claimed is:

1. A method of manufacturing a magnetic storage medium including the steps of coating a web of flexible plastics material with a thin film of a magnetic metal or alloy and laterally stretching the coated web such that the lateral stress applied to the metal film exceeds the tensile strength of the film and the lateral stress applied to the plastics web lies within the yield point of the plastics material, whereby curvature of the medium caused by stress in the film is reduced.

2. A method according to claim 1 wherein the web is laterally stretched to have a lateral strain of at least 0.010.

3. A method according to claim 2 wherein the lateral strain is substantially 0.018.

4. A method according to claim 1 wherein the recording medium is laterally stretched by passage over a curved roll to controllably provide a lateral strain S in the web which is substantially defined by the expression $$S = \frac{16 \, Br}{L^2} \sin \frac{\alpha}{2}$$

wherein the curved roll has a width L, a bow B as hereinbefore defined and a sectional diameter 2r, and the web has an angle of wrap α over the roll.

5. A method according to claims 4 wherein L is substantially 190 mm, r is substantially 19 mm, α is substantially 90° and B is substantially 3 mm.

6. A method according to claim 3 wherein L is substantially 700 mm, r is substantially 60 mm, α is substantially 90° and B is substantially 13 mm.

7. A method according to claim 1 wherein said thin film is an evaporated cobalt nickel alloy.

8. A method according to claim 1 including the step of slitting the laterally stretched coated web.

* * * * *